Nov. 17, 1970  C. W. SIEGMUND ET AL  3,540,821

FLUE GAS RECIRCULATION BURNER

Filed April 1, 1968

C. W. SIEGMUND
R. L. ANDREWS   INVENTORS
D. G. LEVINE

BY *James F. Bryan*

PATENT ATTORNEY

United States Patent Office 3,540,821
Patented Nov. 17, 1970

3,540,821
FLUE GAS RECIRCULATION BURNER
Charles W. Siegmund, Morris Plains, Robert L. Andrews, Roselle, and Duane G. Levine, Fanwood, N.J., assignors to Esso Research and Engineering Company, a corporation of Delaware
Filed Apr. 1, 1968, Ser. No. 717,678
Int. Cl. F23j 5/02
U.S. Cl. 431—116                9 Claims

ABSTRACT OF THE DISCLOSURE

The disclosure relates to a novel recirculation flue gas burner wherein fuel is injected into recirculating flue gas prior to mixing fuel and flue gas with the air necessary to support combustion.

BACKGROUND OF THE INVENTION

During recent years much effort has been expended toward reducing air pollution formed during various combustion processes involving hydrocarbons. One source of pollution has been found to be nitrogen oxides, which after solar irradiation forms ozone, a principal cause of smog. The present invention is concerned with a burner for hydrocarbons of novel construction wherein the production of these oxides may be greatly, if not substantially entirely, eliminated.

Various methods have been proposed in the prior art to reduce the amount of nitrogen oxides accompanying the combustion of hydrocarbon fuels. For example, one form of prior art burner has relied upon a system calling for the recirculation of flue gas followed by the injection of a fuel-air mixture into the recycle stream to reduce the production of nitrogen oxides.

SUMMARY OF THE INVENTION

According to the present invention it has been discovered that the production of nitrogen oxides can be much further reduced by first mixing only recirculated flue gas with the fuel to be burned and thereafter mixing the combination of flue gas and fuel with air necessary to support combustion. It is believed that this desirable result is obtained in that nitrogen oxide production is increased by high flame temperatures and high oxygen concentrations in the flame, and the addition of a relatively cool inert gas (i.e. the recirculated flue gas) leads to lower flame temperatures and lower oxygen concentrations in the flame, thus reducing and minimizing the formation of these oxides.

It has also been found that certain other desirable effects result from the novel process and arrangement, i.e. the fuel nozzle may be shielded to a much greater degree from burner heat and the burning process itself is made less sensitive to maintaining rather exact mixtures of the various elements entering the combustion process.

Thus, it is an object of the instant invention to provide an apparatus and method of operating the apparatus for burning a hydrocarbon fuel while minimizing the production of nitrogen oxides.

Another object of the invention is to provide a burner wherein the fuel injection nozzle is protected from burner heat and the burning process itself to a much greater degree than the protection available in prior art devices.

Figure 1:
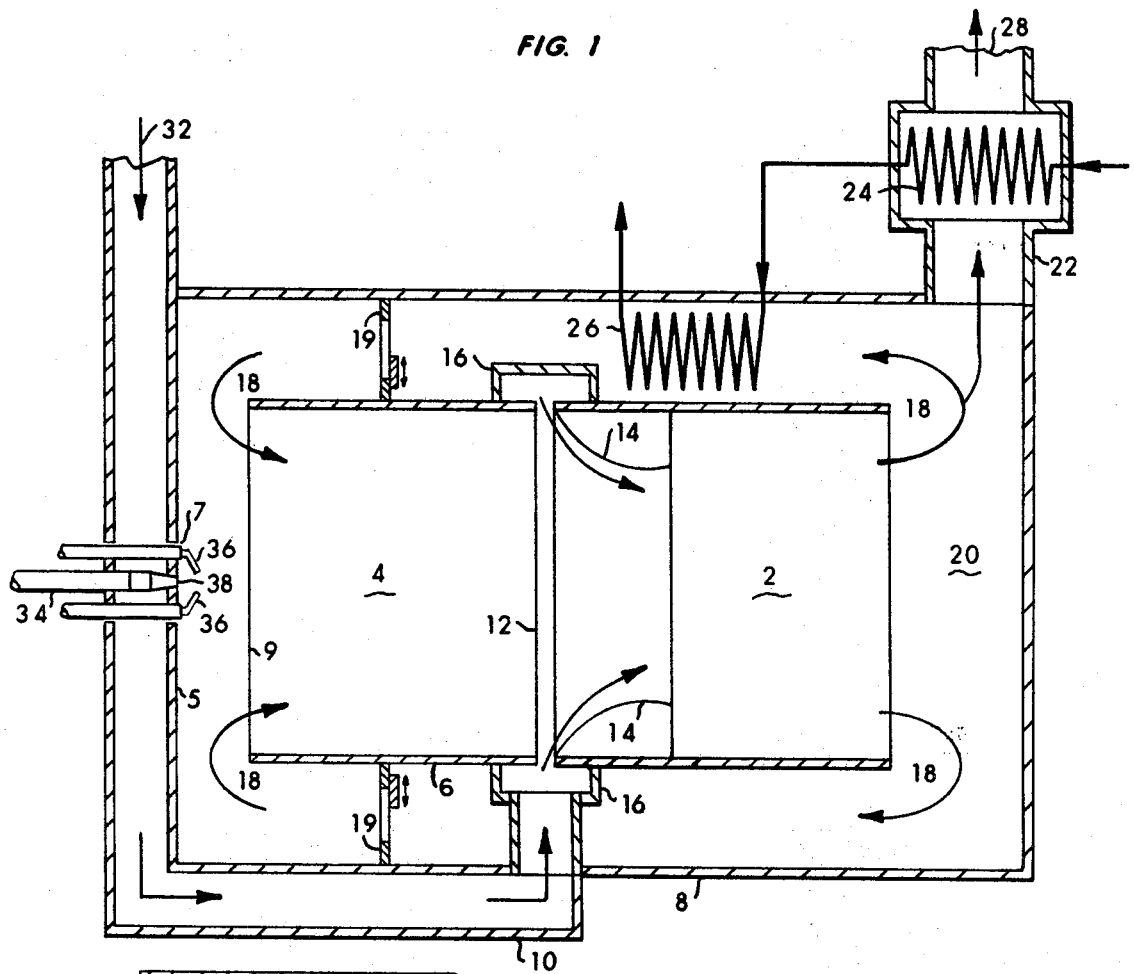
Figure 2:
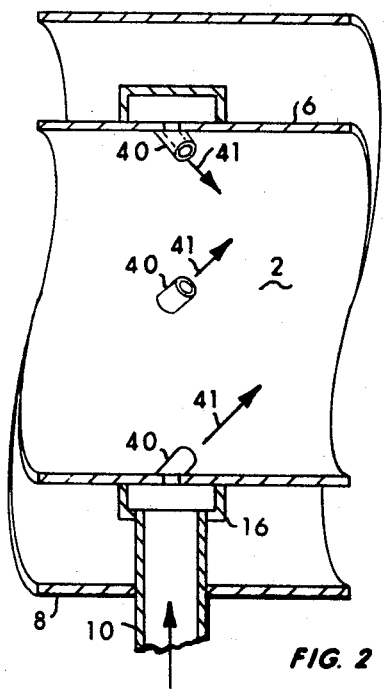

These and other objects of the invention will become more readily apparent upon examination of the following description of preferred embodiments of the invention and of the accompanying drawing in which:

FIG. 1 is a schematic illustration of a burner incorporating the invention arrangement and various constructional details thereof; and FIG. 2 is a fragmentary illustration depicting an alternate form of arrangement for introducing air into the burner of FIG. 1.

Referring to FIG. 1 in detail, a cross-sectional schematic view of a preferred embodiment of the apparatus of the instant invention is shown. The burner of the instant invention comprises an outer casing indiacted at 8, which may be constructed in generally cylindrical form. Closing off the upstream end of the housing 8 is a plate 5 having an aperture 7 therein. Oil is introduced by way of conduit 34 in communication with a nozzle 38, which nozzle is positioned within the aperture 7 in wall 5. Nozzle 38 is provided with a pair of electrodes 36 to initiate combustion and is of conventional construction.

With the central area of the housing 8 a generally cylindrical shroud 6 is rigidly secured. The shroud 6 is divided in two generally cylindrical chambers indicated at 2 and 4 and comprising respectively a combustion chamber or region and a vaporization region. These two regions are separated by an air introduction means 14. The shroud 6 may be fixedly positioned with the interior of housing 8 by any conventional means such as, for example, a plurality of generally radial spider elements (not shown) between the exterior surface of the shroud 6 and the interior surface of the housing 8. Circumferentially disposed around shroud 6 is an annular air feeding ring 16. Ring 16 is in communication with a conduit 10, through which air is introduced in the direction of arrow 32. Air entering the annular ring 16 is directed into combustion region 2 by the air introduction means 14.

As illustrated in FIG. 1, air introduction means 14 is provided with curved convey surfaces. These surfaces are provided so that the inlet air entering annular ring 16 and its associated entrance slit 12 attaches to the curved surface of means 14 according to the well-known Coanda effect. This design provides for the efficient transfer of momentum from the entering air to the gases leaving vaporization region 4. The curved surface of introduction means 14 insures that the entering air and its associated entrained gases from the vaporization region are properly directed into the combustion region 2. Upon exiting from combustion region 2, a portion of the combustion products are recycled in the annular space 20 between housing 8 and shroud 6 to the entrance end 9 of the shroud 6, as indicated by the arrow 18. Due to the convex surfaces and general configuration of means 14, a region of low pressure is created within the vicinity of entrance slit 12. The low pressure region causes the desired recirculation of a portion of the combustion products.

The temperature of the recycled stream entering end 9 of shroud 6 is controlled by transfer of heat to another fluid. This is accomplished in heat exchange means 26, which as shown may be conveniently positioned within annular space 20. In order to increase the thermal efficiency of the unit, the heat exchange media in exchanger 26 may be the same one that is used in a main heat exchanger unit 24, which is provided on combustion gas exhaust line 22. Line 28 leads the exiting combustion products to a suitable flue (not shown).

Thus, in operation the apparatus described above is designed to achieve desired conditions in the combustion region 2 by operating on the principle of spraying a fuel into a hot combustion product stream to achieve vaporization of the fuel and then to add to this mixture of combustion product gas and fuel vapor a sufficient amount of air to achieve combustion of the fuel vapor in the combustion region 2.

As will be appreciated by those skilled in the art, the amount of vaporized fuel entrained may be readily controlled by nozzle 38 and the amount of combustion product recycled may be readily controlled by adjusting the momentum of the inlet air stream entering via the conduit 10. Thus, the ratio of fuel to combustion gas is easily fixed. A further degree of control of the recycled flow rate is obtained by introducing a variable pressure drop into the annular region 20. This may be accomplished, for example, by a register 19 placed in the annulus between shroud 6 and housing 8 in the region where the recycled gases are returning to the vaporization region. The chances of impingement of partially vaporized fuel drops on the surface of the apparatus is minimized by the design above described because the vaporization region and the combustion region are adjacent, separated only by the air inlet device. This design allows for a straight through flow of gases from the fuel nozzle to the flame.

An alternate design for the air entrance means embodied by elements 16, 12 and 14 in FIG. 1 is shown schematically in FIG. 2. In FIG. 2 combustion air enters the combustion region 2 through a plurality of nozzles 40 positioned in a symmetrical fashion around an internal circumference of the combustion region of shroud 6. In a system employing the embodiments shown in FIG. 2, the amount of entrainment is controlled by adjusting the momentum and direction of the air jets 41 issuing from the nozzles 40.

It will be appreciated by those skilled in the art that the stable operation of the apparatus of the instant invention will depend during start-up, on how fast the vaporization region of the shroud 6 reaches optimum operating temperature. In this regard a preferred method of operation is to initially establish a flame in the vaporization region 4. When this is done, the walls of the shroud 6 surrounding the vaporization region 4 will receive heat from the flame within the vaporization region by convection and radiation, and in addition will be subjected to convected heat from the outside by the flow of hot combustion products through annulus 20. A flame is established in the vaporization region 4 by insuring that the recycled path, i.e. the annular region between shroud 6 and housing 8, contains air at the start-up. This will produce a combustible mixture in the vaporization section which may be ignited by ignition electrode 36 located near the fuel injection nozzle 38. Ignition electrodes 38 may be of any suitable conventional type known in the art. To insure a recycled flow of air at start-up, all that is necessary is to begin the flow of air to the chamber prior to starting the flow of fuel through conduit 34. This procedure allows the entering air to purge the combustion product of any previous firing cycle from the annulus. As an alternative to the method of operation just recited, the unit could be operated in such a manner so as to delay the shutting down of the air flow at the end of a firing cycle, once again allowing the air to sweep combustion product from the annulus 20. If this method were employed, it will be appreciated that when the next firing cycle began, the annulus would contain air. In both methods the unit will reach steady state operation when the air in the annulus is used up. This, of course, will cause the flame to move out of the vaporization region and into the combustion region.

What is claimed is:

1. In combination in a fuel burner, a housing, a shroud secured within said housing defining an annular passage between said housing and said shroud, means defining an annular chamber circumferentially affixed to said shroud, air introduction means communicating with said annular chamber and the interior of the shroud, conduit means connecting said annular chamber to a source of air supply, a fuel nozzle mounted in one end of said housing adjacent one open end of the shroud, and electrode means associated with said fuel nozzle, said fuel nozzle being adapted to receive fuel and spray same into said housing, and an exhaust conduit leading from the end of said housing generally opposite said nozzle.

2. The burner of claim 1 further characterized in that said shroud has a vaporization region and a combustion region and said air introduction means is in communication with said combustion region.

3. The burner of claim 2 wherein said air introduction means is provided with convex surfaces whereby the air entering said combustion region flows along said surfaces.

4. The burner of claim 3 wherein a first heat exchanger is provided in said exhaust conduit and a second heat exchanger is provided in said annular passage.

5. The burner of claim 4 further characterized in that the same heat exchange fluid passes through said first heat exchanger and said second heat exchanger.

6. The brurner of claim 1 wherein said air introduction means comprises a plurality of nozzles, which nozzles control the momentum and direction of the entering air.

7. An improved low polluting burner for hydrocarbon fuels which comprises a vaporization chamber, a combustion chamber in communication with said vaporization chamber, air introduction means provided with convex surfaces whereby air enters directly into said combustion chamber by flowing along said surfaces and entraining gases from said vaporization chamber, means for introducing fuel into said vaporization chamber and recirculation means, provided with heat exchange and flow control means within said recirculation means, for recirculating flue gas from said combustion chamber back to said vaporization chamber.

8. An improved low polluting burner for hydrocarbon fuels comprising in combination a housing, a shroud within said housing and defining a flue gas recirculation passageway between said housing and said shroud, a vaporization chamber and a combustion chamber located within said shroud, air introduction means circumferentially affixed to said shroud for introducing air directly into said combusion chamber, a fuel nozzle with an associated ignition electrode, said fuel nozzle introducing fuel into said vaporization chamber and means for controlling the rate at which flue gas from said combustion chamber is recirculated to said vaporization chamber.

9. An improved low polluting fuel burner comprising, a housing, a cylindrical shroud of substantially uniform diameter secured within said housing and being a length less than said housing defining an annular flue gas recirculation chamber about said shroud, means for introducing air into a mid-portion of said shroud, whereby the interior of said shroud is divided into a vaporization chamber upstream of said air introduction means and a combustion chamber downstream of said air introduction means, conduit means connecting said air introduction means to a source of primary air supply, a fuel nozzle mounted in one end of said housing adjacent said vaporization chamber of said shroud, said fuel nozzle being adapted to receive fuel and spray same into said housing, and an exhaust conduit leading from the end of said housing generally opposite said fuel nozzle.

References Cited

UNITED STATES PATENTS

| 3,174,526 | 3/1965 | Von Linde | 431—116 |
| 3,319,692 | 5/1967 | Reba et al. | 431—116 |

FOREIGN PATENTS

| 636,746 | 2/1962 | Canada. |
| 1,044,190 | 6/1953 | France. |

CHARLES J. MYHRE, Primary Examiner